(12) United States Patent
Xu et al.

(10) Patent No.: US 8,027,764 B2
(45) Date of Patent: Sep. 27, 2011

(54) METHOD AND SYSTEM FOR AUTOMATIC TEST DATA GENERATION FOR LOOKUP TABLES

(75) Inventors: Lihua Xu, Irvine, CA (US); Hakan Yazarel, Culver City, CA (US); Noriyasu Adachi, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 508 days.

(21) Appl. No.: 12/276,228

(22) Filed: Nov. 21, 2008

(65) Prior Publication Data
US 2010/0131143 A1    May 27, 2010

(51) Int. Cl.
*G06F 11/00* (2006.01)
*G06F 19/00* (2006.01)

(52) U.S. Cl. .......................................... 701/29; 717/124
(58) Field of Classification Search .................. None
See application file for complete search history.

(56) References Cited

U.S. PATENT DOCUMENTS

| | | | |
|---|---|---|---|
| 5,475,843 A | 12/1995 | Halviatti et al. | |
| 5,652,835 A | 7/1997 | Miller | |
| 5,742,754 A | 4/1998 | Tse | |
| 5,754,760 A | 5/1998 | Warfield | |
| 5,758,061 A | 5/1998 | Plum | |
| 5,799,266 A | 8/1998 | Hayes | |
| 6,067,639 A | 5/2000 | Rodrigues et al. | |
| 6,219,829 B1 | 4/2001 | Sivakumar et al. | |
| 6,249,882 B1 | 6/2001 | Testardi | |
| 6,502,102 B1 | 12/2002 | Haswell et al. | |
| 6,804,796 B2 | 10/2004 | Gustavsson et al. | |
| 6,889,158 B2 | 5/2005 | Penov et al. | |
| 7,146,605 B2 | 12/2006 | Beer et al. | |
| 7,222,265 B1 | 5/2007 | LeSuer et al. | |
| 7,228,524 B2 | 6/2007 | Bailey et al. | |
| 7,430,697 B1 * | 9/2008 | Pabari | 714/724 |
| 2004/0107415 A1 | 6/2004 | Melamed et al. | |
| 2004/0268311 A1 | 12/2004 | Pizzoli et al. | |
| 2006/0230319 A1 | 10/2006 | Ryali et al. | |
| 2008/0222610 A1 | 9/2008 | Joshi et al. | |

OTHER PUBLICATIONS

"Automatic Software Configuration", Simon Schubiger-Banz, 165 pages, Dec. 12, 2002.

* cited by examiner

*Primary Examiner* — Michael J. Zanelli
(74) *Attorney, Agent, or Firm* — Snell & Wilmer L.L.P.

(57) ABSTRACT

The present invention relates to a method and system for automatic test data generation for lookup tables. In one embodiment, the present invention is a method for generating test data for an automotive lookup table including the steps of dividing the automotive lookup table into categories, generating a list of assertions corresponding in a one-to-one relationship with the categories such that each of the categories has an assertion corresponding to it, generating an execution trace for each assertion using a constraint solver, and generating test data for each execution trace.

20 Claims, 6 Drawing Sheets

$Z(n) = foo(x(n), y(n))$ —18

VOLATILE CONST INT Z[] ={(-1), (1), (2), (5),
(7), (3), (4), (4), (4), (2), (0), (4), (4),
(4), (4), (2), (0), (5), (4), (4), (4), (2),
(0), (7), (4), (4), (4), (2), (9), (8), (4),
(4), (4), (2), (7) };

FIG. 3

| y\x | -1 | 1 | 2 | 5 | 7 |
|---|---|---|---|---|---|
| 3 | 4 | 4 | 4 | 2 | 0 |
| 4 | 4 | 4 | 4 | 2 | 0 |
| 5 | 4 | 4 | 4 | 2 | 0 |
| 7 | 4 | 4 | 4 | 2 | 9 |
| 8 | 4 | 4 | 4 | 2 | 7 |

22
ASSERT (!(x<Z(3) && —22a
Z(8)<y<Z(14)));
ASSERT (!(Z(3)<x<Z(4) —22b
&& Z(8)<y<Z(14)));
...

FIG. 6

```
                    28 int fut(a,b) {
    int a, b;
    int x, y;
    a++;
    b++;
    x = a+b;
    y = a-b;
    Z = foo(x,y);    ⟵ 18
    Z++;
    f = z*2;
    RETURN f;
}
```

FIG. 8

METHOD AND SYSTEM FOR AUTOMATIC TEST DATA GENERATION FOR LOOKUP TABLES

BACKGROUND

1. Field

The present invention relates to a method and system for automatic test data generation for lookup tables.

2. Background

In order to test lookup tables, test data should be generated. However, generating test data can be extremely tedious and require a large amount of time. Furthermore, when test data is used to test the lookup table, the lookup table is often tested in environments which may not accurately simulate the real world.

Thus, there is a need for a more efficient method and apparatus to generate test data for lookup tables and to more accurately test the lookup tables.

SUMMARY

In one embodiment, the present invention is a method for generating test data for an automotive lookup table including the steps of dividing the automotive lookup table into categories, generating a list of assertions corresponding in a one-to-one relationship with the categories such that each of the categories has an assertion corresponding to it, generating an execution trace for each assertion using a constraint solver, and generating test data for each execution trace.

In another embodiment, the present invention is a method for generating test data for an automotive lookup table including the steps of analyzing the automotive lookup table to determine input parameters of the automotive lookup table, dividing the automotive lookup table into categories based on the input parameters, generating a list of assertions corresponding in a one-to-one relationship with the categories such that each of the categories has an assertion corresponding to it, generating an execution trace for each assertion using a constraint solver, and generating test data for each execution trace.

In yet another embodiment, the present invention is a system for generating test data for an automotive lookup table including a storage unit storing an automotive lookup table, an assertion generation unit connected to the storage unit, the assertion generation unit configured to analyze the automotive lookup table to determine input parameters of the automotive lookup table, divide the automotive lookup table into categories based on the input parameters, and generate a list of assertions corresponding in a one-to-one relationship with the categories such that each of the categories has an assertion corresponding to it, and each of the assertions includes one or more constraints, the constraints being based on the input parameters. The present invention can also include a constraint solver unit connected to the assertion generation unit, the constraint solver unit generating an execution trace for each assertion, and a test data generation unit generating test data for each execution trace.

BRIEF DESCRIPTION OF THE DRAWINGS

The features, objects, and advantages of the present invention will become more apparent from the detailed description set forth below when taken in conjunction with the drawings, wherein:

FIG. 2 depicts an equation for a lookup table;
FIG. 3 depicts a lookup table;
FIG. 4 depicts a lookup table;
FIG. 5 depicts a plurality of constraints;
FIG. 6 depicts a plurality of assertions;
FIG. 8 depicts a function which utilizes a lookup table.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
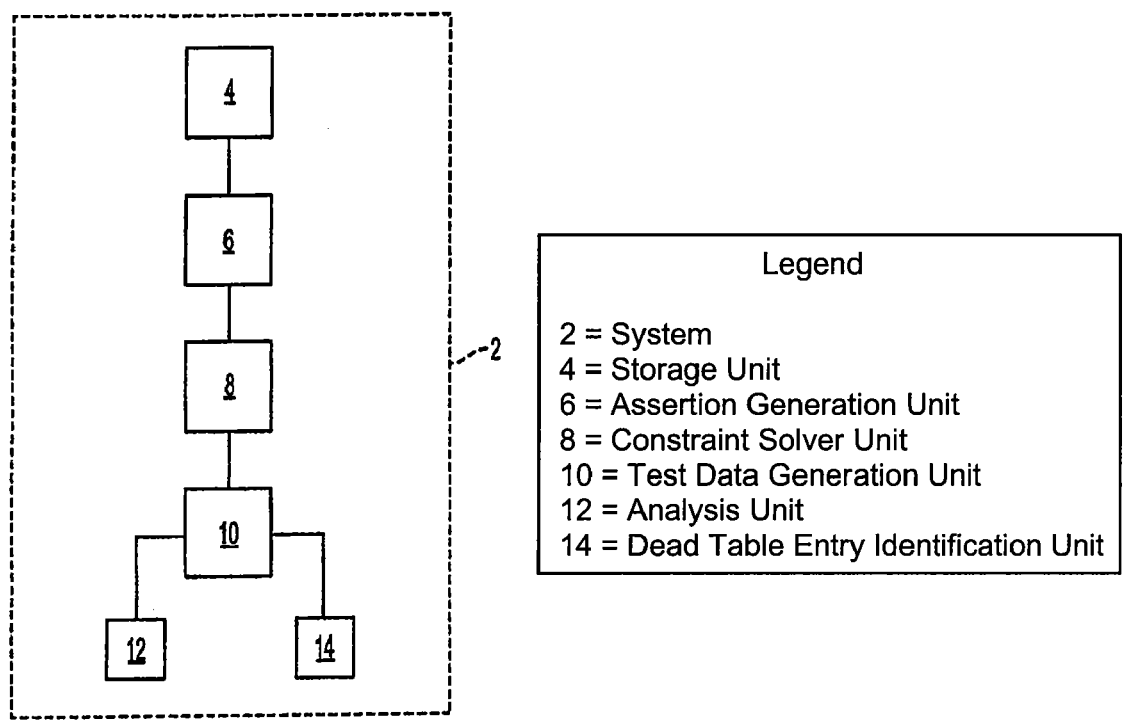
FIG. 1 is a schematic diagram of a system for automatic test data generation for lookup tables.

FIG. 1 is a schematic diagram of a system for automatic test data generation for lookup tables. As seen in FIG. 1, a system 2 includes a storage unit 4, an assertion generation unit 6, a constraint solver unit 8, a test data generation unit 10, an analysis unit 12, and a dead table entry identification unit 14.

Storage unit 4 is connected to assertion generation unit 6 and can store an automotive lookup table such as automotive lookup table 18 with input parameters x(n) and y(n) as shown in FIG. 2. Automotive lookup table 18 can be represented as an automotive lookup table list 16 as shown in FIG. 3. As seen in FIG. 4, automotive lookup table 16 can also be represented by a two dimensional graph. Although automotive lookup table 16 is two dimensional, it is contemplated that it can be n-dimensional where n is any positive integer.

Assertion generation unit 6 is connected to storage unit 4 and constraint solver unit 8. Assertion generation unit 6 can analyze automotive lookup table 16 to determine the input parameters of automotive lookup table 18 and divide automotive lookup table 18 into categories 20 such as category 20a and category 20b in FIG. 5. Furthermore, assertion generation unit 6 can generate a list of assertions corresponding in a one-to-one relationship such as assertions 20 depicted in FIG. 6. As seen in FIG. 6, assertions 20 can include assertions 22a and 22b.

Each of the assertions 22 can include one or more constraints. For example, assertion 22a can have the constraint $(x<Z(3)\&\&Z(8)<y<Z(14))$, while assertion 22b can have the constraint $(Z(3)<x<Z(4)\&\&Z(8)<y<Z(14))$. Each assertion can thus constrain x and y to certain values. Each of categories 20 can have an assertion 22 corresponding to it. Although two assertions 22 are depicted, it is contemplated that any number of assertions 22 can be used. Likewise each assertion can have any number of constraints.

Constraint solver unit 8 is connected to assertion generation unit 6 and test data generation unit 10. Constraint solver unit 8 generates an execution trace such as execution trace 24 depicted in FIG. 7 for each assertion 22.

Figure 7:
FIG. 7 depicts an execution trace.

Test data generation unit 10 is connected to constraint solver unit 8, analysis unit 12, and a dead table entry identification unit 14. Test data generation unit 10 generates test data, such as test data 26 for each execution trace 24. As shown in FIG. 7, test data 26 includes the equations a=2 and b=1. Although only two equations are depicted, it is contemplated that any number of equations can be used for each test data.

Analysis unit 12 is connected to test data generation unit 10 and can analyze each category 20 using test data 26 to verify that automotive lookup table 18 is accurate. This analysis of each category 20 using test data 26 can be done within a context of function 28 depicted in FIG. 8 which utilizes automotive lookup table 18. That is, test data 26 can be used as inputs for automotive lookup table 18 within function 28.

Dead table entry identification unit 14 is connected to test data generation unit 10. The dead table entry identification unit 14 can identify dead table entries (not shown) where test data such as test data 26 could not be produced for a category 20. Dead table entry identification unit 14 can also form a log of dead table entries (not shown). Dead table entries can occur, for example, through the semantics of a particular software and/or a data flow of system 2 which prevented inputs from be placed into a particular category 20.

Figure 9:
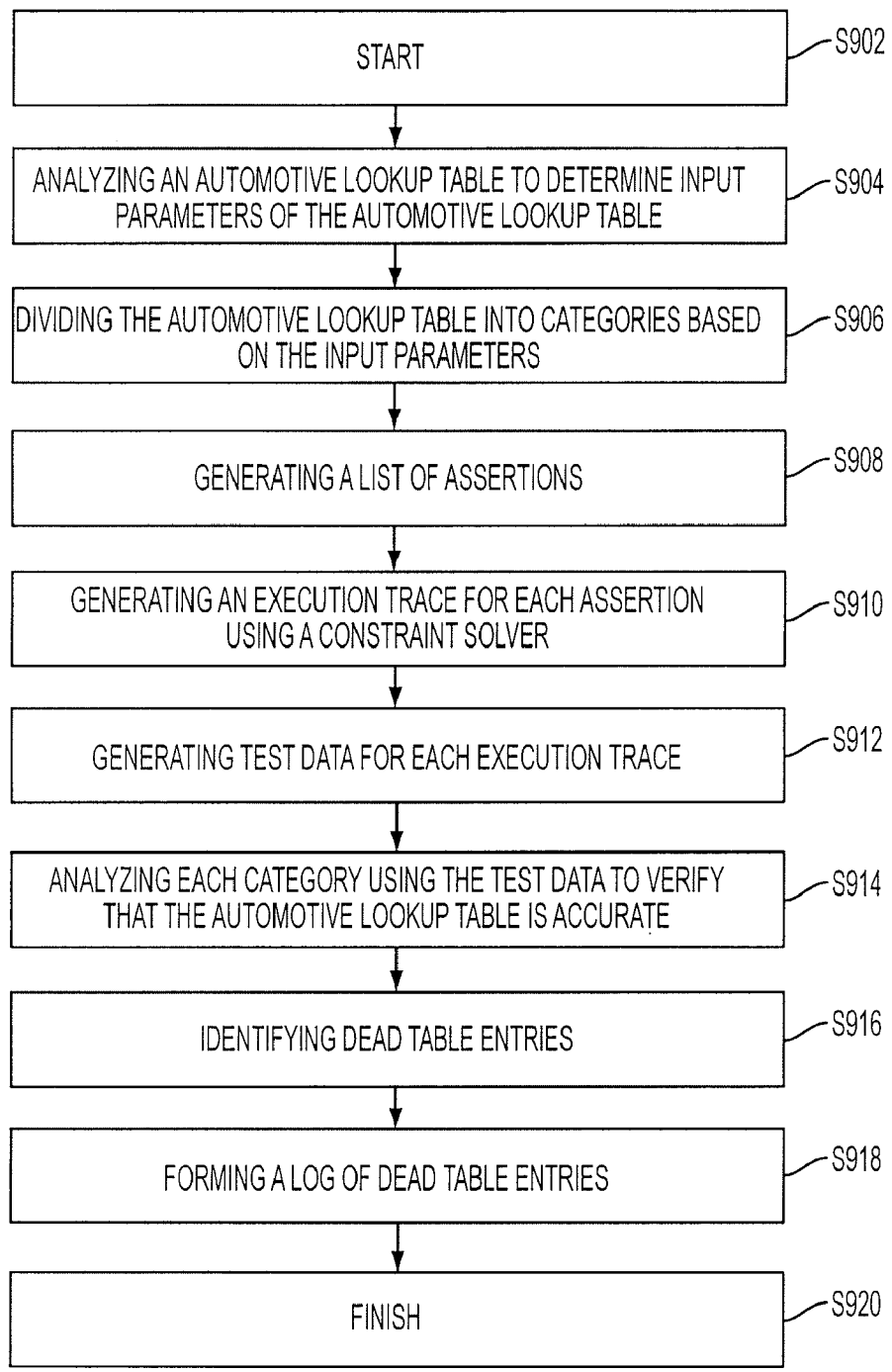
FIG. 9 is a flow chart for an automatic test data generation for lookup tables.

FIG. 9 is a flow chart for an automatic test data generation for lookup tables. In step S902, the process begins. In Step S904, automotive lookup table 18 is analyzed to determine input parameters of automotive lookup table 18 such as x(n) and y(n). Although two input parameters are shown, it is contemplated that any number of input parameters can be used. In Step S906, automotive lookup table 18 is divided into categories 20 based on the input parameters. In one embodiment, every input parameter of automotive lookup table 18 corresponds to one or more categories. In Step S908, a list of assertions 22 are generated. In one embodiment, each assertion 22 includes one or more constraints. In another embodiment, the constraints are based on the input parameters. It is contemplated that Steps S904, S906, and S908 can be performed by assertion generation unit 6.

In Step S910, an execution trace 24 is generated for each assertion 22. This can be accomplished, for example, using constraint solver unit 8. In Step S912, test data 26 is generated for each execution trace 24. It is contemplated using Step S912 can be performed using test data generation unit 10. In Step S914, each category 20 can be analyzed using test data 26 to verify that automotive lookup table 18 is accurate. In one embodiment, the analysis of each category 20 using test data 26 is done within a context of function 28 which utilizes automotive lookup table 18. That is, test data 26 can be used as inputs for automotive lookup table 18 within function 28. It is contemplated that Step S914 can be performed by analysis unit 10.

In Step S916, dead table entries can be identified, for example, through dead table entry identification unit 14. In Step S918, a log of the dead table entries can be formed. Step S918 can also be accomplished using dead table entry identification unit 14. In Step S920, the process ends.

Although not shown, a report or chart can also be generated by the present invention regarding the results of the analysis on the lookup table including a result of using each test data.

It is contemplated that by using the present invention, the time required to generate test data for automotive lookup tables and verify the automotive lookup tables can be reduced and the accuracy of the test results analyzing the automotive lookup table can be improved. For example, where it may have taken 40 to 80 hours to generate and verify a single automotive lookup table using conventional methods and apparatuses, it is contemplated that with the present invention, it may take only 0.5 to 1 hour to generate and verify the single automotive lookup table. Furthermore, since the automotive lookup table is tested within the context of the function that utilizes the automotive lookup table, it is contemplated the testing can be performed in an environment that better simulates the operational conditions of the automotive lookup table and provide more accurate results on the acceptability of the automotive lookup table.

The present invention can be embodied, for example, on a microprocessor, a computer, and/or a computer readable medium that causes a computer to perform certain functions.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for generating test data for an automotive lookup table comprising the steps of:
   dividing the automotive lookup table into categories;
   generating a list of assertions corresponding in a one-to-one relationship with the categories such that each of the categories has an assertion corresponding to it;
   generating an execution trace for each assertion using a constraint solver; and
   generating test data for each execution trace.

2. The method of claim 1 further comprising the step of analyzing the automotive lookup table to determine input parameters of the automotive lookup table.

3. The method of claim 2 wherein the automotive lookup table is divided into categories based on the input parameters.

4. The method of claim 3 wherein every input parameter of the automotive lookup table corresponds to one or more categories.

5. The method of claim 3 wherein each of the assertions includes one or more constraints.

6. The method of claim 5 wherein the constraints are based on the input parameters.

7. The method of claim 6 further comprising the step of analyzing each category using the test data to verify that the automotive lookup table is accurate.

8. The method of claim 7 wherein the step of analyzing each category using the test data to verify that the automotive lookup table is accurate is performed within a context of a function that utilizes the automotive lookup table.

9. The method of claim 1 further comprising the step of identifying dead table entries where test data could not be produced for a particular category.

10. The method of claim 9 further comprising the step of forming a log of dead table entries.

11. A method for generating test data for an automotive lookup table comprising the steps of:
    analyzing the automotive lookup table to determine input parameters of the automotive lookup table;
    dividing the automotive lookup table into categories based on the input parameters;
    generating a list of assertions corresponding in a one-to-one relationship with the categories such that each of the categories has an assertion corresponding to it;
    generating an execution trace for each assertion using a constraint solver; and
    generating test data for each execution trace.

12. The method of claim 11 wherein each of the assertions includes one or more constraints.

13. The method of claim 12 wherein the constraints are the constraints based on the input parameters.

14. The method of claim 11 further comprising the step of analyzing each category using the test data to verify that the automotive lookup table is accurate.

15. The method of claim 14 wherein the step of analyzing each category using the test data to verify that the automotive lookup table is accurate is performed within a context of a function that utilizes the automotive lookup table.

16. The method of claim 11 further comprising the steps of:
    identifying dead table entries where test data could not be produced for a particular category; and
    forming a log of dead table entries.

17. A system for generating test data for an automotive lookup table comprising:
    a storage unit storing an automotive lookup table;
    an assertion generation unit connected to the storage unit, the assertion generation unit configured to
        analyze the automotive lookup table to determine input parameters of the automotive lookup table,
        divide the automotive lookup table into categories based on the input parameters, and
        generate a list of assertions corresponding in a one-to-one relationship with the categories such that each of the categories has an assertion corresponding to it, and each of the assertions includes one or more constraints, the constraints being based on the input parameters;
    a constraint solver unit connected to the assertion generation unit, the constraint solver unit generating an execution trace for each assertion; and
    a test data generation unit generating test data for each execution trace.

18. The system of claim 17 further comprising an analysis unit connected to the test data generation unit, the analysis unit analyzing each category using the test data to verify that the automotive lookup table is accurate.

19. The system of claim 18 wherein the analysis unit analyzes each category using the test data to verify that the automotive lookup table is accurate within a context of a function that utilizes the lookup table.

20. The system of claim 17 further comprising
    a dead table entry identification unit connected to the test data generation unit, the dead table entry identification unit identifying dead table entries where test data could not be produced for a particular category, and forming a log of dead table entries.

* * * * *